(12) United States Patent
Killer et al.

(10) Patent No.: US 10,897,662 B2
(45) Date of Patent: Jan. 19, 2021

(54) ASSEMBLY FOR PROTECTING ACOUSTIC DEVICE

(71) Applicants: W. L. Gore & Associates GmbH, Putzbrunn (DE); W. L. Gore & Associates (Shenzhen) Co., Ltd., Shenzhen (CN)

(72) Inventors: Anton Killer, Dietramszell (DE); Joona Markus Riihimaeki, Munich (DE); Xishou A. Li, Shenzhen (CN)

(73) Assignees: W. L. Gore & Associates GmbH, Putzbrunn (DE); W. L. Gore & Associates (Shenzhen) Co., Ltd., Shenzhen (CN)

( * ) Notice: Subject to any disclaimer, the term of this patent is extended or adjusted under 35 U.S.C. 154(b) by 0 days.

(21) Appl. No.: 16/329,872

(22) PCT Filed: Sep. 14, 2016

(86) PCT No.: PCT/CN2016/099033
§ 371 (c)(1),
(2) Date: Mar. 1, 2019

(87) PCT Pub. No.: WO2018/049600
PCT Pub. Date: Mar. 22, 2018

(65) Prior Publication Data
US 2019/0246192 A1 Aug. 8, 2019

(51) Int. Cl.
*H04R 1/08* (2006.01)
*B29C 65/16* (2006.01)
(Continued)

(52) U.S. Cl.
CPC ......... *H04R 1/086* (2013.01); *B29C 65/1635* (2013.01); *B29C 65/1661* (2013.01);
(Continued)

(58) Field of Classification Search
CPC .. H04R 1/086; H04R 1/023; H04R 2201/029; H04R 2499/11; B29C 65/1435;
(Continued)

(56) References Cited

U.S. PATENT DOCUMENTS

| 6,512,834 B1* | 1/2003 | Banter | H04R 1/086 |
| | | | 381/189 |
| 2004/0089640 A1* | 5/2004 | Bager | A61F 5/445 |
| | | | 219/121.64 |

(Continued)

FOREIGN PATENT DOCUMENTS

| CN | 101291798 A | 10/2008 |
| CN | 101795900 A | 8/2010 |

(Continued)

OTHER PUBLICATIONS

International Search Report and Written Opinion issued in International Application No. PCT/CN2016/099033 dated Jun. 13, 2017.

*Primary Examiner* — Walter F Briney, III
(74) *Attorney, Agent, or Firm* — Greenberg Traurig, LLP (57) ABSTRACT

An assembly (1) for protecting an acoustic device comprises an expanded polytetrafluorethylene (ePTFE) membrane (3) and first and second polymeric substrates (2, 4) disposed on opposing sides (5, 6) of the membrane (3). The first substrate (2) is transmissive for laser light of a predetermined wavelength, and the membrane (3) is joined to the first and second substrates (2, 4) by first and second laser weld joints (9, 10) on the first side (5) of the membrane (3) and the second side (6) of the membrane (3), respectively, that are created in a single laser transmission welding step through the first polymeric substrate (2) towards the second polymeric substrate (4). The first side (5) of the membrane (3) may be at least partially absorbent for the laser light and the second side (6) may be at least partially transmissive for the laser (Continued)

light. This may be achieved by a color gradient from black to white from the first side (5) to the second side (6).

15 Claims, 7 Drawing Sheets

(51) Int. Cl.
| | |
|---|---|
| *B29L 31/34* | (2006.01) |
| *B29C 65/00* | (2006.01) |
| *H04R 1/02* | (2006.01) |
| *B29C 65/50* | (2006.01) |
| *B29C 65/48* | (2006.01) |

(52) U.S. Cl.
CPC ...... *B29C 65/1677* (2013.01); *B29C 65/1683* (2013.01); *B29C 66/1122* (2013.01); *B29C 66/24221* (2013.01); *B29C 66/305* (2013.01); *B29C 66/472* (2013.01); *B29C 66/71* (2013.01); *B29C 66/712* (2013.01); *B29C 66/727* (2013.01); *B29C 66/73521* (2013.01); *B29C 66/73921* (2013.01); *B29C 66/81267* (2013.01); *B29C 66/8322* (2013.01); *B29C 66/843* (2013.01); *H04R 1/023* (2013.01); *B29C 65/168* (2013.01); *B29C 65/1616* (2013.01); *B29C 65/4825* (2013.01); *B29C 65/5057* (2013.01); *B29C 66/30326* (2013.01); *B29C 66/8122* (2013.01); *B29C 66/919* (2013.01); *B29C 66/939* (2013.01); *B29L 2031/3418* (2013.01); *H04R 2201/029* (2013.01); *H04R 2499/11* (2013.01)

(58) Field of Classification Search
CPC ............ B29C 65/1635; B29C 65/1661; B29C 65/1677; B29C 65/1683; B29C 65/1616; B29C 65/168; B29C 65/4825; B29C 65/5057; B29C 66/1122; B29C 66/24221; B29C 66/305; B29C 66/472; B29C 66/71; B29C 66/712; B29C 66/727; B29C 66/7352; B29C 66/73921; B29C 66/81267; B29C 66/8322; B29C 66/843; B29C 66/30326; B29C 66/8122; B29C 66/919; B29C 66/939; B29L 2031/3418

See application file for complete search history.

(56) References Cited

U.S. PATENT DOCUMENTS

| | | | |
|---|---|---|---|
| 2005/0202303 A1* | 9/2005 | Schlag | H01M 8/0267 429/210 |
| 2005/0208361 A1* | 9/2005 | Enjoji | H01M 8/0267 429/483 |
| 2007/0154043 A1 | 7/2007 | Gebert | |
| 2008/0221499 A1 | 9/2008 | Ardans et al. | |
| 2010/0068431 A1 | 3/2010 | Bansal et al. | |
| 2010/0227543 A1* | 9/2010 | Furuyama | B29C 65/1635 454/270 |
| 2010/0227544 A1 | 9/2010 | Furuyama et al. | |
| 2010/0236410 A1 | 9/2010 | Farzana et al. | |

FOREIGN PATENT DOCUMENTS

| | | |
|---|---|---|
| CN | 101816187 A | 8/2010 |
| CN | 102328432 A | 1/2012 |
| CN | 105377783 A | 3/2016 |
| CN | 105694440 A | 6/2016 |
| EP | 0740264 A2 | 10/1996 |
| EP | 2219387 B1 | 5/2014 |

* cited by examiner

ASSEMBLY FOR PROTECTING ACOUSTIC DEVICE

RELATED APPLICATIONS

The present application is a national phase filing under 35 USC 371 of International Application No. PCT/CN2016/099033 filed on Sep. 14, 2016, the entire contents and disclosures of which is hereby incorporated by reference.

FIELD OF THE INVENTION

This invention relates to an assembly for protecting an acoustic device, in particular including an ePTFE membrane, and further to a method of manufacturing such assembly. The assembly may be referred to as an acoustic vent.

BACKGROUND OF THE INVENTION

Electronic devices, such as mobile phones or wearables, may comprise acoustic devices, generally transducers, such as microphones, speakers, etc. In order to allow sound transmission, an enclosure of the electronic device has openings located over the acoustic device. However, contaminants can enter the enclosure and compromise the acoustic performance. In order to protect the acoustic device, protective acoustic covers are placed over the openings to protect the transducer from damage from dust and water intrusion. Typically, an assembly for protecting the acoustic device is used, which comprises an expanded polytetrafluoroethylene (ePTFE) membrane, which may be porous and water impermeable, so as to protect the acoustic device from dust, liquids and other contaminants while minimizing negative effects on the acoustic characteristics.

In known acoustic cover assemblies an ePTFE membrane is placed between two support layers, such as polymeric substrates, and secured to the substrates by an adhesive. However, compression of the assembly when mounted in the electronic device causes degradation of the acoustic performance. More specifically, compressing the assembly displaces the adhesive, which may tension the membrane, thereby leading to an increase in sound transmission loss. This also occurs when relatively stiff adhesives are used. Also, known manufacturing methods are not able to produce acoustic covers with an outer diameter of less than 2.5 mm while maintaining acoustic performance.

Apart from that, it is known to join polymeric layers by laser transmission welding. However, laser transmission welding is difficult for more than two layers because the laser light will be transformed into heat on the surface of the first absorbent layer and does not reach further layers disposed beyond the first absorbent layer.

SUMMARY OF THE INVENTION

It is therefore an object of the present invention to provide an assembly for protecting an acoustic device, in particular with an ePTFE membrane, which is easy to manufacture and provides improved acoustic characteristics, as well as an improved method of manufacturing such assembly.

This object is achieved according to the present invention by an assembly and a method having the features of the independent claims. Preferred embodiments and further developments of the invention are specified in the claims dependent thereon.

According to the invention, an assembly for protecting an acoustic device is provided, which comprises an expanded polytetrafluoroethylene (ePTFE) membrane, a first polymeric substrate and a second polymeric substrate. The ePTFE membrane has a first side and a second side opposite the first side, wherein the first polymeric substrate is disposed on the first side of the membrane, and the second polymeric substrate is disposed on the second side of the membrane opposite the first polymeric substrate. The first substrate is at least partially, preferably fully, transmissive for laser light of a predetermined wavelength, and the membrane is joined to the first and second substrates by first and second laser weld joints on the first side of the membrane and the second side of the membrane, respectively.

According to one embodiment, the first and second laser weld joints, which result from a laser transmission welding process, are congruent to each other. Congruent means that the first and second laser weld joints are disposed in substantial alignment to each other on the first and second sides of the membrane, respectively, and are substantially identical in size and shape. This is particularly caused by a single laser welding step, in which both the first laser weld joint and the second laser weld joint are created simultaneously as described in more detail below. Preferably, a laser weld direction, i.e. a direction of the laser beam that impacts the assembly, is perpendicular or substantially perpendicular to the assembly, more specifically to a plane in which the layer compound of the membrane and the first and second substrates extends. The first and second laser weld joints are also regarded as "congruent" if they are not exactly identical in size and shape, e.g. if one of the laser weld joints is wider than the other laser weld joint, e.g. due to temperature differences during the laser weld process, as long as the first and second laser weld joints follow the same path or trace, which is drawn by the laser beam during the laser welding process. It will be appreciated that the first and second laser weld joints may form a single laser weld joint when they meet within the thickness of the membrane. This may depend on the thickness of the membrane and possibly the porosity of the membrane. In this embodiment and the following embodiment, the membrane may have a thickness of less than about 20 µm, preferably less than 10 µm, more preferably 5 µm.

The polymeric substrates extend over only a portion of the respective sides of the ePTFE membrane opposite to each other. In other words, the first and second polymeric substrates each have at least one aperture, wherein the at least one aperture in the first polymeric substrate is aligned with the at least one aperture in the second polymeric substrate and the membrane extends over the aperture. The at least one aperture forms an "active area" of the ePTFE membrane, i.e. the area of the membrane that is exposed and allows sound transmission from and to the acoustic device while the acoustic device is protected by the membrane. The aperture may have a diameter of about 1 mm. The outer diameter of the entire assembly may be in the range from about 2 mm to about 2.5 mm.

According to another embodiment, either the first side or the second side of the membrane is at least partially absorbent for the laser light and the respective other one of the first and second sides of the membrane is at least partially transmissive for the laser light. This configuration may be advantageous also in combination with the aforementioned embodiment, in which the first and second laser weld joints are congruent. It may be further advantageous, in particular in combination with the configuration in which the first and second sides of the membranes have different absorption properties (or transmission properties), if the second polymeric substrate is absorbent for the laser light of the predetermined wavelength. By providing different absorption properties on the first and second sides of the membrane, a partial transmissivity in the membrane is created. This has the effect that heat can be caused by the laser light both on the first side of the membrane and the second side of the membrane. In this manner, the first and second laser weld joints can be created simultaneously in a single laser transmission welding step.

Preferably, the one of the first and second sides of the membrane that is at least partially absorbent for the laser light is substantially non-transparent, preferably black. Generally, the first side of the membrane may have a first color and the second side of the membrane may have a second color, which is different from the first color. For instance, the first side of the membrane may be black and the second side of the membrane may be white or gray, or vice versa, depending on which one of the sides of the membrane is intended to be more absorbent for the laser light. In particular, it may be advantageous if a color gradient exists between the first side of the membrane and the second side of the membrane, i.e. a gradual change from the first color to the second color, e.g. from black to white or from black to gray. The different first and second colors, in particular the color gradient may result in a membrane having a partial transmissivity for the laser light of the predetermined wavelength in the range from about 5% to about 15%, preferably about 7% to about 12%.

The colored membrane, more specifically the first and second colors as mentioned above, can be manufactured in any known technique. For instance, the color can be incorporated into the membrane during the membrane manufacture itself or afterwards in an impregnation or coating process. In particular, at least one of the color of the first side of the membrane and the color of the second side of the membrane may be integrated in the porous structure of the membrane or may be attached to a respective surface of the membrane within a carrier, like a coating. The color may be a black ink, e.g. black carbon particles. The above mentioned color gradient may be created by the color or coating penetrating the porous structure of the ePTFE membrane from one side.

As mentioned, the membrane may comprise a coating applied to at least one of the first side and the second side of the membrane. Preferably, the coating is an oleophobic coating and exhibits a black color, e.g. by the addition of black carbon particles. The coating may also have hydrophobic properties. In particular, the coating may be applied to the one of the first and second sides of the membrane that is at least partially absorbent for the laser light. As mentioned above, the coating may penetrate into the porous structure of the membrane and is, thus, not releasable from the membrane. The membrane along with the coating may, thus, be regarded as "monolithic".

In another embodiment, the first side of the ePTFE membrane and the second side of the ePTFE membrane may have substantially the same transmission (or absorption) characteristics with respect to the laser light of the predetermined wavelength. In particular, the membrane may be at least partially transmissive for the laser light of the predetermined wavelength, or may be at least partially absorbent for the laser light of the predetermined wavelength. The membrane may be substantially absorbent for the laser light, e.g. by providing a black color.

Particularly in those embodiments in which the membrane is substantially absorbent for the laser light, the membrane may have a thickness that allows a sufficient amount of heat caused by the laser welding process and necessary for creating the first and second laser weld joints to pass through the membrane during the laser welding process. By providing such membrane that is sufficiently thin, it is possible to create the first and second laser weld joint in a single laser transmission weld step in case the membrane has substantially uniform transmission characteristics for the laser light of the predetermined wavelength. The membrane may have a thickness of about 10 µm, preferably less than 10 µm, more preferably 5 µm.

As already mentioned above, the second polymeric substrate is preferably absorbent for the laser light of the predetermined wavelength. Thus, in a specific embodiment, the first polymeric substrate may be transparent, whereas the second polymeric substrate may be black. The second polymeric substrate is the "bottom" layer during the laser welding process, i.e. the second polymeric substrate is disposed in the side of the membrane facing away from the laser beam. That means that the second substrate is the last layer that can absorb the laser energy during the laser transmission welding process. In some embodiments, however, the second polymeric substrate may be transmissive, or at least partially transmissive, for the laser light, in particular in embodiments, in which the membrane absorbs at least a part of or substantially the entire laser energy. It will be appreciated that a person skilled in the art will understand that at least one of the layers will be absorbent for the laser light in order to be able to carry out the laser transmission welding process.

Preferably, at least one of, or both of, the first polymeric substrate and the second polymeric substrate has a thickness of about 100 µm, preferably less than 100 µm, such as 10 µm. The first and second polymeric substrates may be equal in thickness or different. For instance the thickness of first substrate may be twice the thickness of the second substrate. At least one of the first and second polymeric substrates, such as both, may comprise or may be made of polycarbonate (PC). Other suitable polymeric materials, such as polypropylene (PP) or polyethylene (PE), may be used. The first and second polymeric substrates may have the same material characteristics, such as melting point, or different characteristics. For example, one of the first and second substrates, in particular the one that is possibly subject to less heat during the laser welding process, may have a lower melting point than the other one of the polymeric substrates.

In another embodiment, the membrane may be transparent and may have transparent laser absorbent additives, in particular in contrast to embodiments in which the membrane exhibits a black color. That means, in view of all embodiments as described above, the black color may be replaced by other absorbent agents that appear transparent in visible light.

In any of the aforementioned embodiments, the membrane is preferably water proof. More specifically, the membrane may have a water entry pressure (WEP) of at least 1 PSI, preferably at least 20 PSI. This improves protection for an acoustic device in an electronic device. As mentioned above, the assembly particularly is an acoustic vent for protecting an opening for passing sound. The assembly preferably has an acoustic loss of less than 5 dB at 1,000 Hz, more preferably less than 1.5 dB at 1,000 Hz. This acoustic loss is preferably achieved under a compression force of 10 N, which is the force with which the assembly is mounted in an enclosure of an electronic device. However, in contrast to known assemblies using adhesive instead of laser welding, the acoustic loss is substantially independent from the compression force.

According to the invention, a method of manufacturing an assembly for protecting an acoustic device is provided, in particular manufacturing one of the above described embodiments. The method comprises the steps of providing an expanded polytetrafluorethylene (ePTFE) membrane having a first side and a second side opposite the first side, providing a first polymeric substrate and providing a second polymeric substrate. The membrane and the first and second substrates may be provided in form of bands or strips that are unrolled from respective carrier rolls. The first polymeric substrate is at least partially, preferably fully, transmissive for laser light of a predetermined wavelength.

As described above, the first polymeric substrate is provided on only a portion of the first side of the membrane, and the second polymeric substrate is provided on only a portion of the second side of the membrane opposite the first polymeric substrate to create exposed areas of the membrane. This may be achieved by creating holes, e.g. by die cutting, laser cutting or punching, into the first and second substrates before joining the first and second substrates with the membrane.

The method further comprises the step of joining the membrane to the first and second polymeric substrates by laser transmission welding. This is carried out by applying a laser beam of the predetermined wavelength through the first polymeric substrate towards the second polymeric substrate, thereby creating first and second laser weld joints on the first side of the membrane with the first polymeric substrate and on the second side of the membrane with the second polymeric substrate, respectively. The predetermined wavelength may be in the range from about 960 nm to about 1064 nm. The layers may be joined by a single laser welding path, such as a ring or a helical path, or by more than one laser welding path, such as two or more rings, lines etc., e.g. concentric rings, preferably concentric with the aperture in the polymeric substrates, i.e. the exposed area of the ePTFE membrane.

After joining the ePTFE membrane with the first polymeric layer and the second polymeric layer, the resulting strip or band comprising the three layers may be cut into pieces or separate acoustic vents may be created from the strip or band, depending on the desired outer shape of the acoustic vent, e.g. by die cutting, laser cutting or punching. The finished acoustic vents may then be collected and packed as will be understood by a person skilled in the art.

The method may further comprise the step of applying a vacuum from the second side during the joining step. By applying a vacuum on the second polymeric substrate, the membrane is drawn into the opening or openings of the second substrate, thereby creating a "membrane slack", i.e. an excess amount of material of the membrane, e.g. 0.1 mm to 0.2 mm deflection depending on the thickness of the second polymeric substrate. During the manufacturing method, a vacuum support plate for supporting the layers, e.g. a plate with a hole or air permeable material (e.g. sinter metal), may be used. Other methods for creating a membrane slack may be used in addition or alternatively, such as applying a vacuum from the first side, creating an over pressure from one of the first and second sides, e.g. by blowing air onto the membrane, or mechanical means. Creating an excess amount of material may help to avoid an over tension of the membrane, so as to improve acoustic performance.

As described above, it is particularly advantageous if either the first side or the second side of the membrane at least partially absorbs the laser light and the respective other one of the first and second sides at least partially transmits the laser light, such that the first and second laser weld joints are created simultaneously. The ePTFE membrane and the first and second polymeric substrates may be configured as described above. In particular, the first and second sides of the membrane may exhibit different colors, such as black and white or black and gray with a color gradient as described above.

Alternatively, as also described above, the first side of the membrane and the second side of the membrane may have substantially the same transmission characteristics with respect to the laser light, i.e. the membrane may at least partially transmit the laser light of the predetermined wavelength, or may at least partially absorb the laser light of the predetermined wavelength. In this case, it is advantageous if the membrane has a thickness that allows a sufficient amount of heat caused by the laser transmission welding process and necessary for creating the first and second laser weld joints to pass through the membrane during the laser transmission welding process as explained above.

By providing an assembly for protecting an acoustic device (also referred to as acoustic vent or acoustic protective cover) as described above, in particular manufactured by a method as described above, advantageous effects can be achieved. During manufacturing of the assembly only a single laser welding step is needed to create a secure bond between the ePTFE membrane and the first and second polymeric substrates. The assembly is easy to handle because there is no adhesive that might be compressed during installation of the acoustic vent in an enclosure of an electronic device. The "active area", i.e. the area of the exposed membrane which allows sound transmission can be maximized while allowing a minimum part size, e.g. the inner diameter of an aperture in the first and second substrates may be at least 1 mm, while the overall outer diameter may be less than 2.5 mm, e.g. 2 mm. The maximum overall thickness may be less than 0.25 mm, e.g. 0.21 mm with each of the first and second substrates having a thickness of 100 µm and the membrane having a thickness of 10 µm. Generally, the membrane may have a thickness of less than about 20 µm, preferably less than 10 µm, more preferably 5 µm. It is possible to design a solution that meets a customer's application-specific requirements, such as part size, shape etc., while acoustic characteristic can be optimized.

BRIEF DESCRIPTION OF THE DRAWINGS

The foregoing summary, as well as the following detailed description of preferred embodiments, will be better understood when read in conjunction with the appended drawings. For the purpose of illustrating the present disclosure, reference is made to the drawings. The scope of the disclosure is not limited, however, to the specific embodiments disclosed in the drawings. In the drawings.

DETAILED DESCRIPTION

Figure 1A:
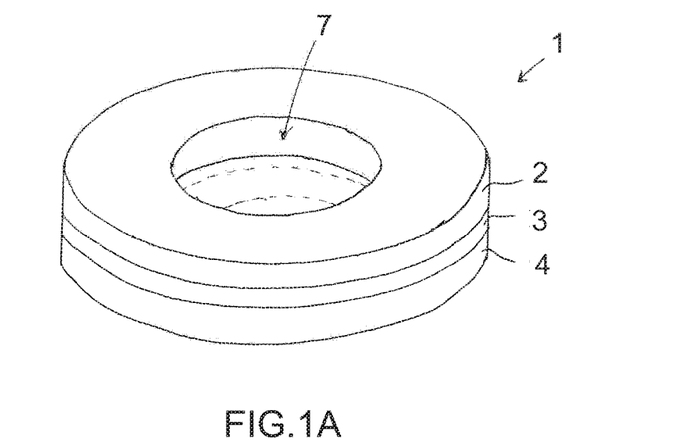
FIGS. 1A to 1C show different views of an assembly for protecting an acoustic device.
Figure 1B:
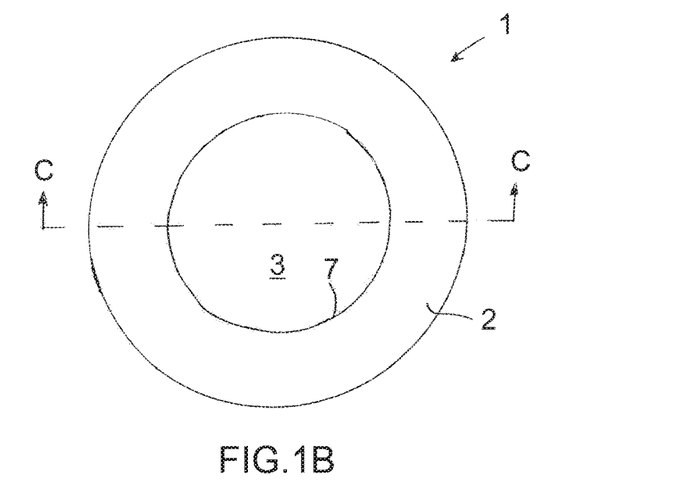
Figure 1C:
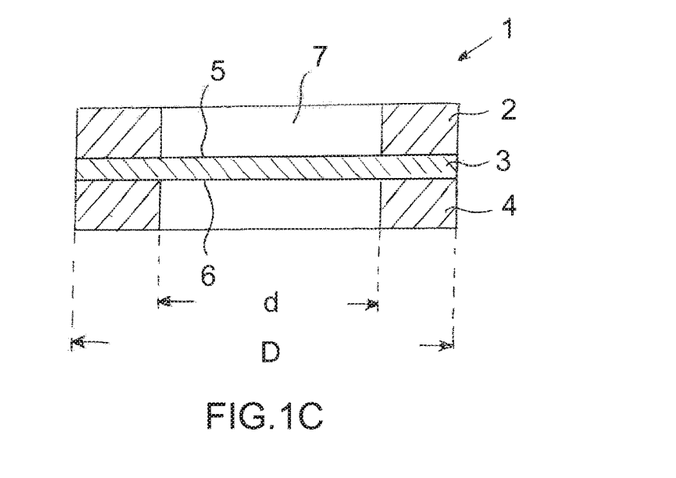

Referring to FIGS. 1A to 1C a general embodiment of an assembly 1 for protecting an acoustic device is illustrated. The assembly 1 may be referred to as acoustic cover, acoustic protective cover or acoustic vent. FIG. 1A shows a perspective view of an acoustic vent, FIG. 1B shows a top view, and FIG. 1C shows a cross-sectional view along the line C-C in FIG. 1B. It will be appreciated that the drawings are only schematic and not true to scale, in particular the cross-sectional views. The assembly 1 is configured to protect an acoustic device in an electronic device, such as a microphone or speaker in a mobile phone (not shown). It will be appreciated that various applications for other transducers in other electronic devices may be envisioned. The assembly 1 is shown as circular having a circular opening 7 covered by an ePTFE membrane 3. The assembly 1 has an outer diameter D, which may be about 2 mm, and the opening 7 has an inner diameter d, which may be about 1 mm. The membrane 3 is supported by a top or first polymeric substrate 2 on a top surface or first side 5 of the membrane 3 and a bottom or second polymeric substrate 4 on a bottom surface or second side 6 of the membrane 3. The polymeric substrates 2, 4, which may be referred to as support layers, may be made of polycarbonate (PC), polypropylene (PP) or polyethylene (PE). Thus, the assembly 1 comprises a compound of three layers 2, 3, 4, namely the membrane 3 sandwiched between the first and second polymeric substrates 2, 4.

It will be appreciated that any other size and shape other than circular, such as rectangular, square, oval, polygonal, etc. may be chosen depending on the application. Furthermore, it will be appreciated that any other size, number and shape of the opening 7 can be chosen. In particular, the size and shape of the opening 7 may correspond to the outer dimension of the assembly 1, or the shapes of the assembly 1 and the opening 7 may be different, e.g. a circular opening 7 may be provided in a rectangular assembly 1. More than one opening, such as two, three, four or more openings may be provided. For instance, the opening 7 may be divided by bridges that provide additional support for the ePTFE membrane 3. Also, other suitable polymeric materials for the first and second substrates 2, 4 may be envisioned.

Figure 2A:
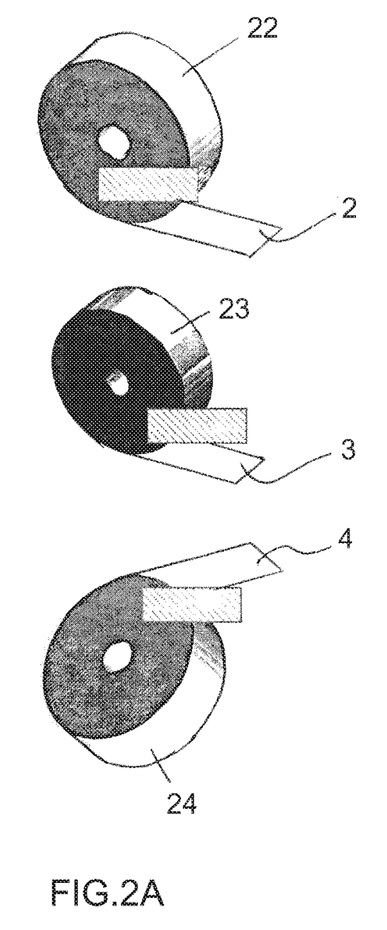
FIGS. 2A to 2E show general steps of a method of manufacturing an assembly for protecting an acoustic device, applicable in any one of the methods illustrated in FIGS. 3A to 6C.
Figures 2B, 2C, 2D, 2E:
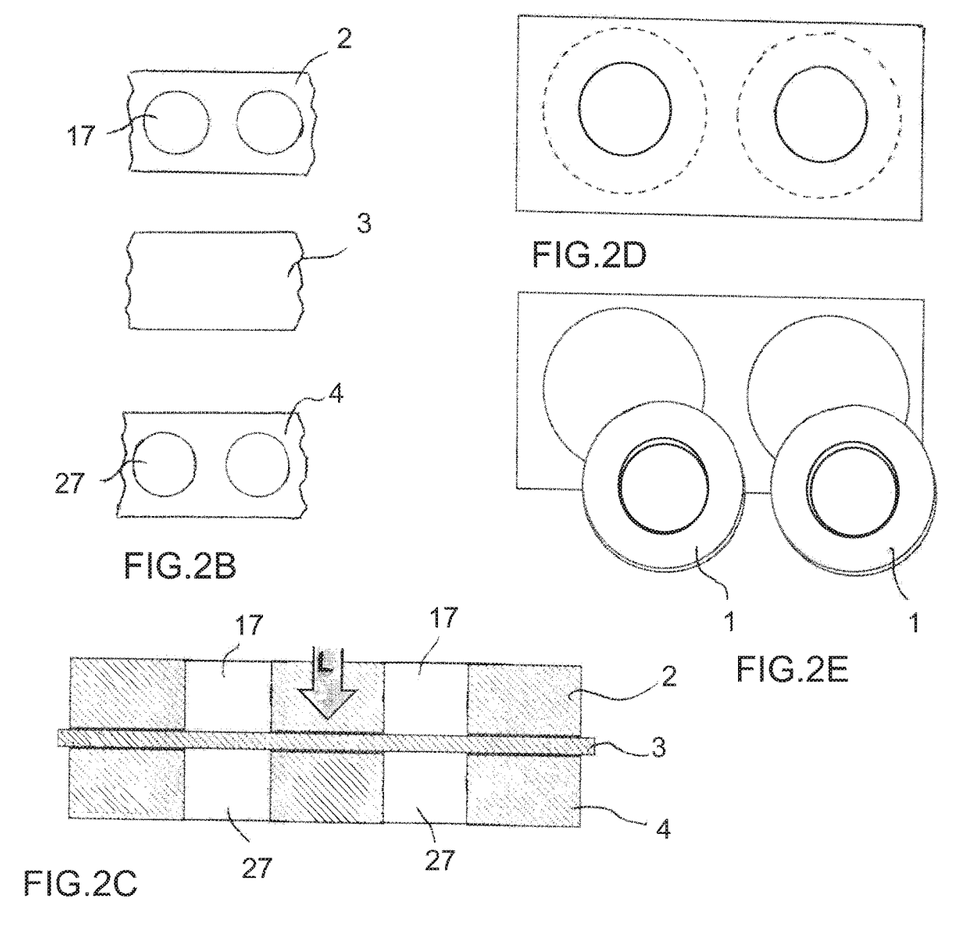

Different embodiments will be described in particular with reference to their method of manufacturing. Like parts are provided with like reference numerals and it will be appreciated that substantial parts of the manufacturing methods may be similar or identical. In particular, generally referring to FIGS. 2A to 2E, in a first step, the first and second polymeric substrates 2, 4 and the ePTFE membrane 3 are provided as bands or strips that are unrolled from respective carrier rolls 22, 23, 24 and fed to the manufacturing process, as shown in FIG. 2A. As shown in FIG. 2B, before joining the membrane 3 with the first and second polymeric substrates 2, 4, holes 17 and 27 are created in the first substrate 2 and the second substrate 4, respectively, e.g. by die cutting, laser cutting or punching. Respective holes 17, 27 in the first and second substrates 2, 4 will be aligned to form the opening 7 in the acoustic vent 1 as shown in the cross-sectional view of FIG. 2C. The holes 17, 27 may be disposed in regular distances along the length of the strips or bands and may have a diameter of 1 mm. The layers 2, 3, 4 are then joined by laser transmission welding as indicated in FIG. 2C and explained in more detail with reference to the following drawings. After the layers 2, 3, 4 have been joined, the finished acoustic vents 1 will be separated from the strip or band, e.g. by die cutting, laser cutting or punching, as indicated in FIGS. 2D and 2E.

As mentioned above, the ePTFE membrane 3 is joined to the first and second polymeric substrates 2, 4 by laser welding, more specifically laser transmission welding. That means the first polymeric substrate 2 is substantially transmissive for laser light of a predetermined wavelength, which may be in the range from about 960 nm to about 1064 nm. At least one of the membrane 3 and the second polymeric substrate 4 is at least partially absorbent for said laser light so as to transform the laser energy into heat. This melts the surface area between the membrane 3 and the first polymeric substrate 2 and the membrane 3 and the second polymeric substrate 4, respectively. In this manner, a first laser weld joint 9 and a second laser weld joint 10 are created.

In any of the manufacturing methods, a joining pressure may be applied to the stack of layers 2, 3, 4. This may be achieved e.g. by a pressure plate 11 that is pressed onto the first polymeric substrate 2 in a direction towards the second polymeric substrate 4 (see FIGS. 3B, 4B, 5B, and 6B). The stack of layers 2, 3, 4 may be supported by a support plate 12, e.g. a metal plate, which may have pins. The pressure plate 11 is transmissive for the laser light. For instance, a glass plate may be provided as the pressure plate 11. During the laser welding process, the polymeric substrates 2, 4 melt and bond with the membrane 3. After cooling, permanent joints 9, 10 are created.

As will be described in more detail below, the first and second laser weld joints 9, 10 are substantially congruent because they are created in a single laser weld step. While the laser weld joints 9, 10 are shown schematically in FIGS. 3A to 6C, in particular in FIGS. 3C, 4C, 5C and 6C, they may have any suitable configuration, such as one or more rings, a helical path, one or more linear paths etc. The laser spot may have a diameter of about 0.6 mm for example.

Referring to FIGS. 3A to 6C, in particular FIGS. 3B, 4B, 5B, and 6B, the laser transmission welding process is shown schematically. A laser beam is indicated at arrow L. Although two laser beams L may be shown, it will be appreciated that only a single laser beam may be used that is moved along a welding path. The laser weld direction is generally indicated as perpendicular to the assembly 1. However, oblique laser weld directions may be envisioned. The intensity of the laser beam is schematically indicated by the width of the illustrated arrow. The width of the arrow does not correspond to the width of the laser beam or the diameter of the laser spot. The laser beam causes heat to create the laser weld joints 9, 10. Heat affected areas H are generally indicated as encircled areas.

Figure 3A:
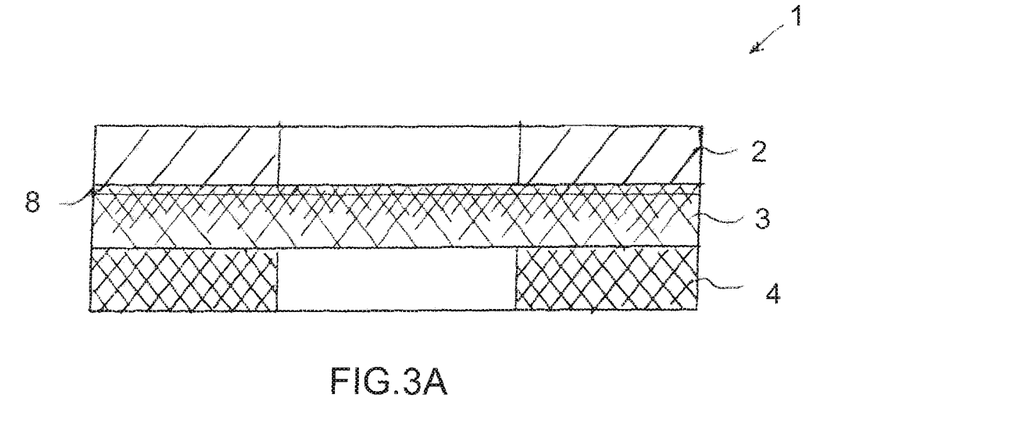
FIGS. 3A to 3C show different stages of a method of manufacturing an assembly for protecting an acoustic device according to a first embodiment.
Figure 3B:
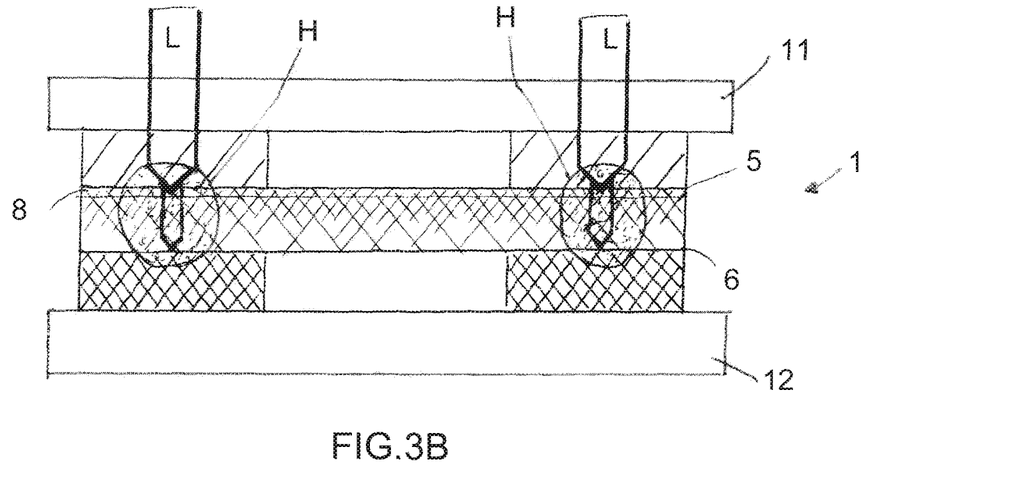
Figure 3C:
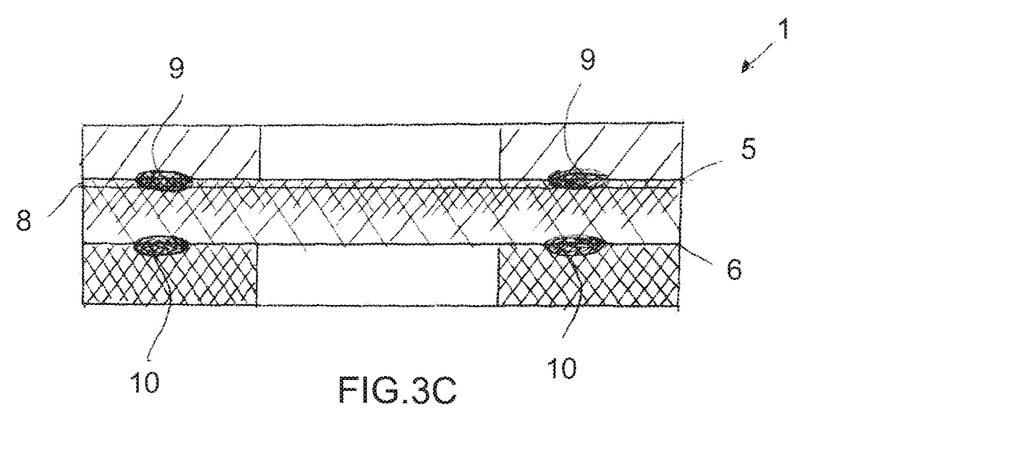

Referring now to FIGS. 3A to 3C, an assembly 1 is shown in which the ePTFE membrane 3 has a color gradient from black to white or from black to gray. As indicated by the different shading in the cross-sectional views, the membrane 3 is black on its first side 5 and white or gray on its second side 6 in this embodiment. The black color may be created by black carbon particles. Here, the color gradient is created by a coating 8 that penetrates into the membrane 3 from the first side 5 towards the second side 6. The coating 8 may be an oleophobic coating. The laser beam L penetrates through the first polymeric substrate 2 and the entire thickness of the membrane 3. The laser energy is only partially absorbed by the first side 5, so that a part of the laser energy is absorbed at the second side 6. The second substrate 4 is absorbent for the laser light in this embodiment, e.g. black which is indicated by the denser shading. Laser weld joints 9, 10 can be created between the membrane 3 and the first substrate 2 and the membrane 3 and the second substrate 4, respectively. In this embodiment, since the first side of the membrane 3 absorbs more energy, only e.g. 7% of the laser energy may pass through the membrane 3. The division of absorbed laser energy within the membrane 3 can be controlled by the type of the gradient.

Figure 4A:
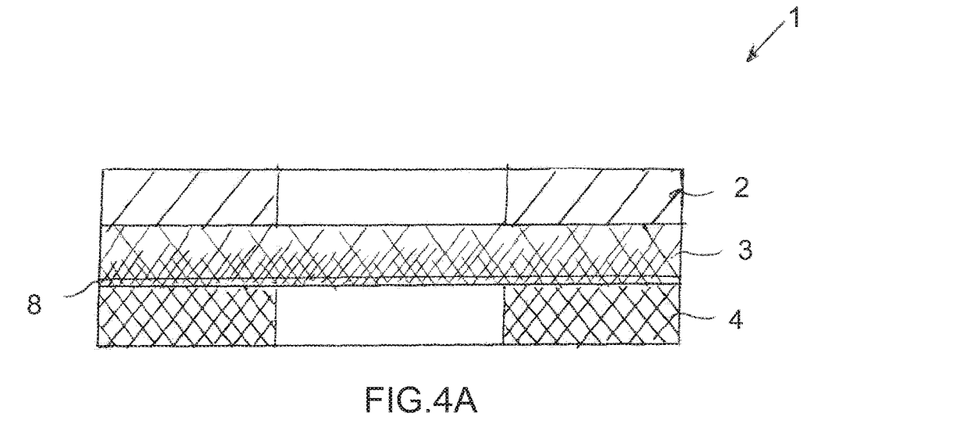
FIGS. 4A to 4C show different stages of a method of manufacturing an assembly for protecting an acoustic device according to a second embodiment.
Figure 4B:
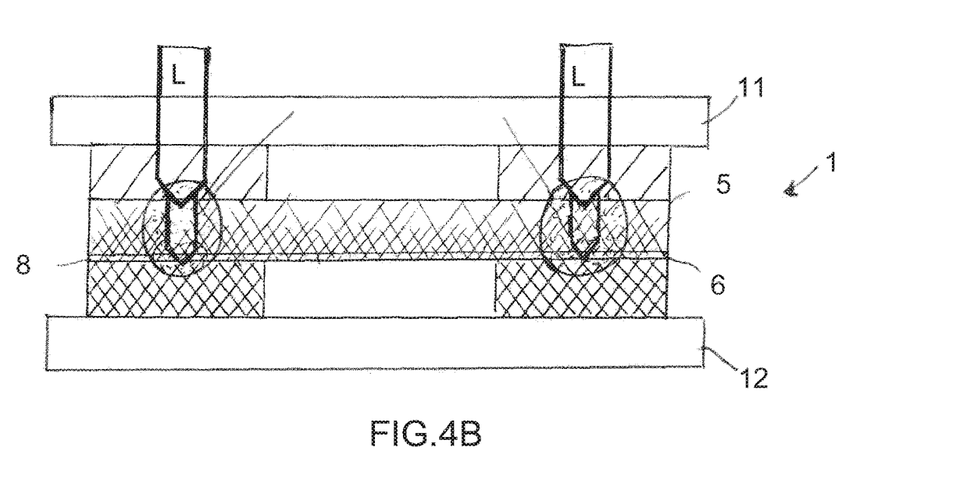
Figure 4C:
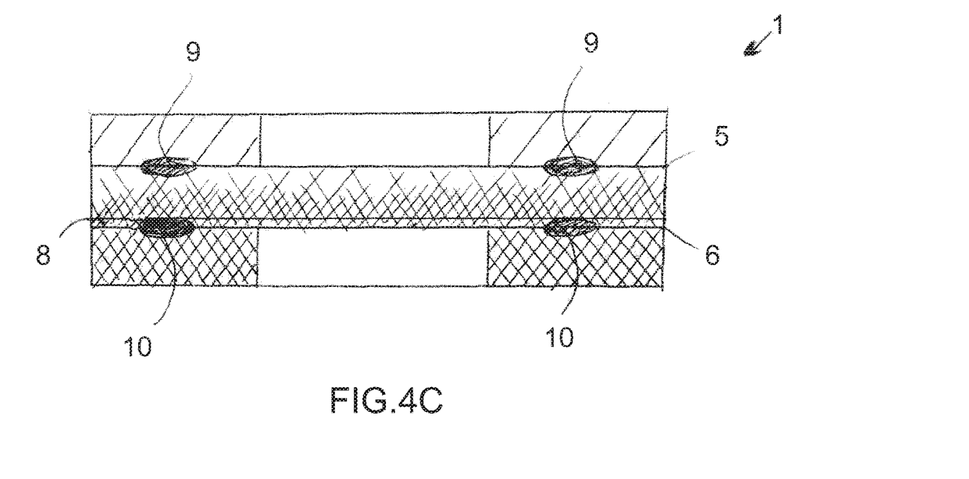

A similar embodiment, in which the ePTFE membrane exhibits a color gradient is shown in FIGS. 4A to 4C. However, compared to the embodiment of FIGS. 3A to 3C, the color gradient is inverted, i.e. the first side 5 of the membrane 3 is gray, while the second surface 6 of the membrane 3 is black. As in the previous embodiment, the color gradient is created by a coating 8 that penetrates into the porous structure of the ePTFE membrane 3. Since the first side 5 is lighter compared to the darker second side 6, the first side 5 of the membrane 3 absorbs less energy in this embodiment compared to the previous embodiment. However, the amount of absorbed energy is sufficient to create the first laser weld joint 9. The laser beam L passes further through the membrane 3 and is absorbed at the interface to the second polymeric substrate 4 to create the second laser weld joint 10. For instance, the membrane 3 may be transmissive for about 10% to 12% of the total laser energy.

Figure 5A:
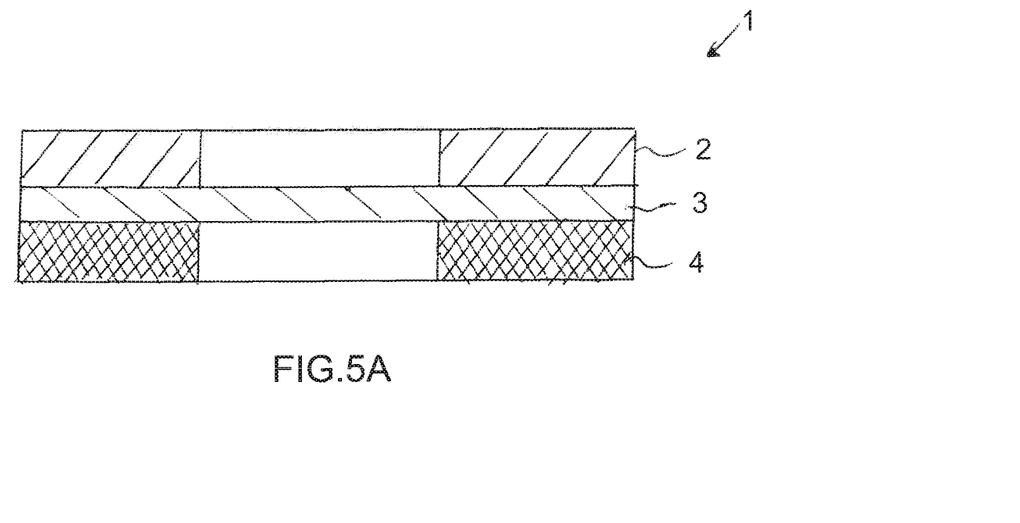
FIGS. 5A to 5C show different stages of a method of manufacturing an assembly for protecting an acoustic device according to a third embodiment.
Figure 5B:
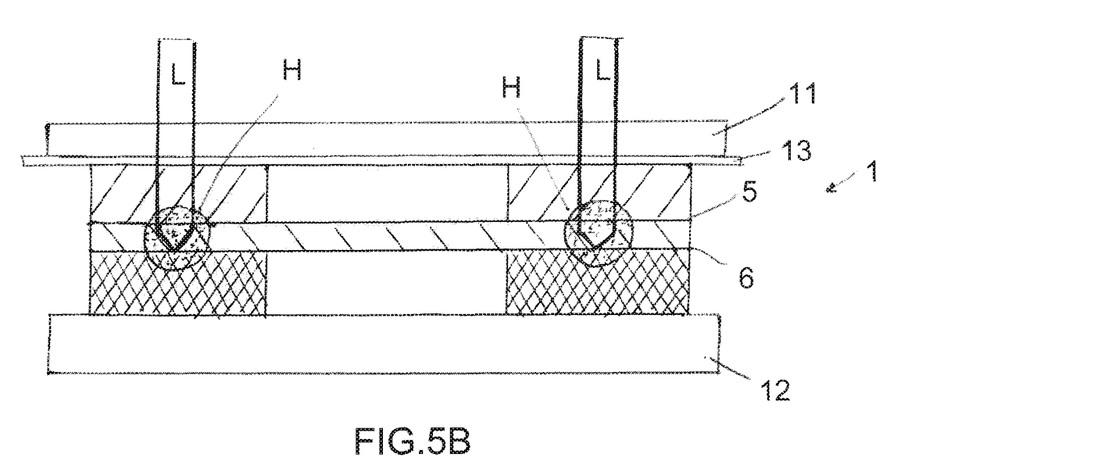
Figure 5C:
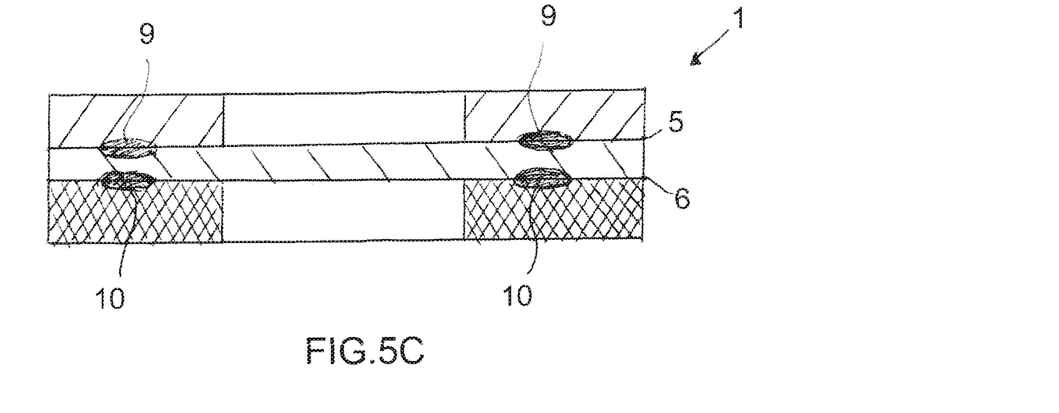

Referring now to FIGS. 5A to 5B another embodiment is illustrated in which the ePTFE membrane 3 does not exhibit a color gradient but is transmissive for the laser light, e.g. the membrane 3 may be white. Substantially the entire laser energy is absorbed by the second polymeric substrate 4, which is black in this embodiment. However, the membrane 3 is thin enough to allow the heat to pass through the membrane 3 towards the first polymeric substrate 2 as indicated by the heat affected area H. Thus, although substantially the entire laser energy is absorbed on the second side 6 of the membrane 3, laser weld joints 9, 10 on both sides of the membrane 3 can be created simultaneously. This may be improved by an optional insulation layer 13 on top of the assembly 1, i.e. on the side of the first polymeric substrate 2, which avoids that heat dissipates away but is distributed through the layer compound.

Figure 6A:
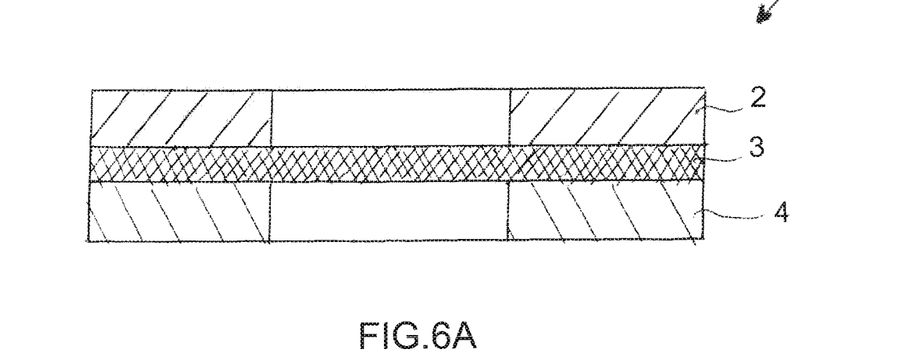
FIGS. 6A to 6C show different stages of a method of manufacturing an assembly for protecting an acoustic device according to a fourth embodiment.
Figure 6B:
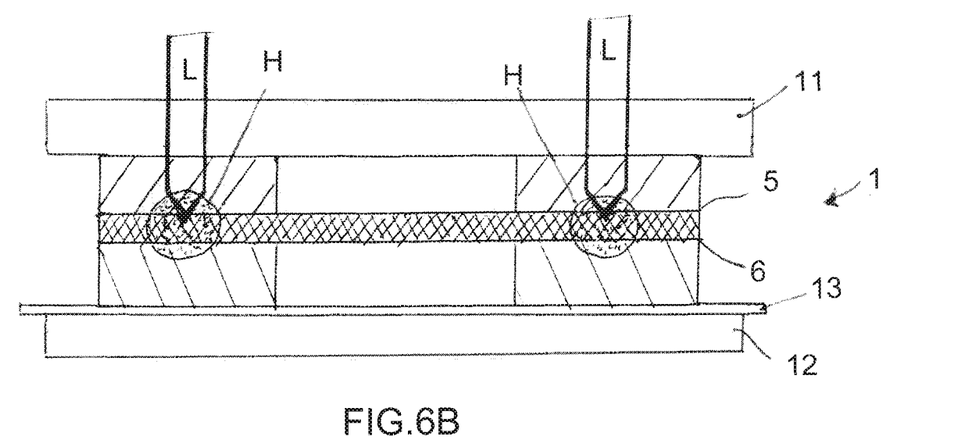
Figure 6C:
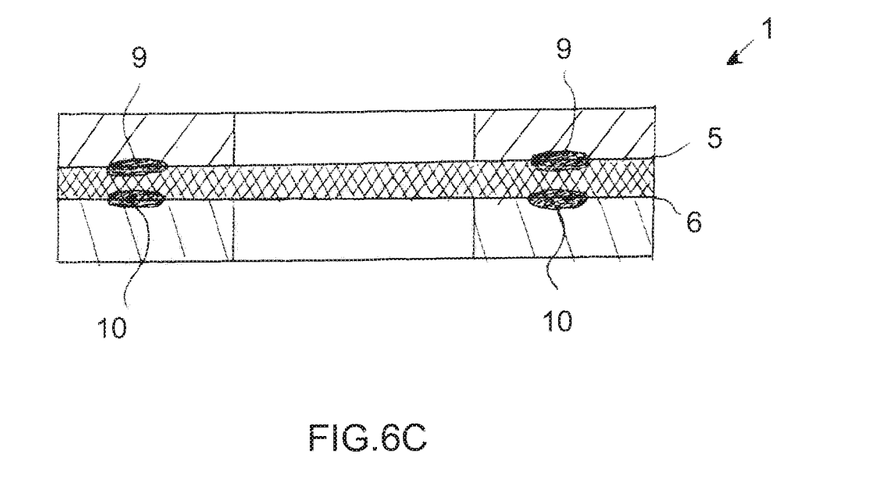

Referring now to FIGS. 6A to 6C another embodiment is illustrated. In contrast to the previous embodiment of FIGS. 5A to 5C, the membrane 3 is black such it absorbs substantially the entire laser energy. More specifically, the laser energy is absorbed at the first side 5 of the membrane 3. The second polymeric substrate 4 is transmissive for the laser energy, e.g. white or transparent. However, in this embodiment the second polymeric substrate 4 may alternatively absorbent for the laser light, e.g. black. Like in the previous embodiment, the membrane 3 is sufficiently thin such that the heat dissipates through the membrane 3 on both sides 5, 6 of the membrane 3 to create the laser weld joints 9, 10 simultaneously. An insulation layer 13 may optionally be provided underneath the layer compound, i.e. on the side of the second polymeric substrate 4 in order to promote heat accumulation on the second side 6 of the membrane 3.

Figure 7:
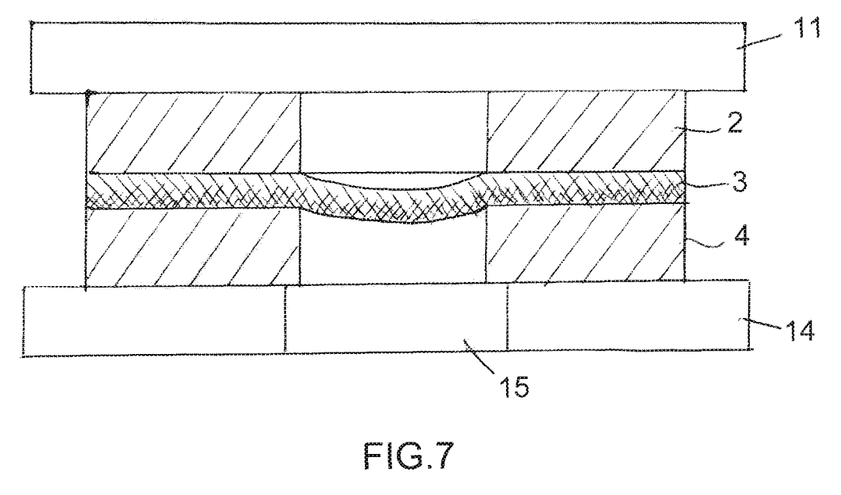
FIG. 7 shows a variant of any one of the methods shown in FIGS. 3A to 6C.

Referring to FIG. 7, a vacuum support plate 14 for supporting the layers 2, 3, 4 is illustrated. It will be appreciated that the vacuum support plate 14 may be used in any of the aforementioned manufacturing methods instead of the support plate 12. The vacuum support plate 14 is provided to create an excess amount of material of the membrane 3 in the opening 7 by pulling the membrane 3 into the aperture of the second polymeric substrate 4. The vacuum support plate 14 may have a hole 15 or air permeable material (e.g. sinter metal) that allows creating a negative pressure on the membrane 3. In this embodiment, the first and second polymeric substrates 2, 4 are substantially transmissive for the laser light, while the membrane exhibits a color gradient from a light color (e.g. white or gray) on the first side 5 of the membrane 3 to a dark color (e.g. black) on the second side 6 of the membrane 3. As in the previously described embodiments, this configuration allows creating the first and second laser weld joints 9, 10 simultaneously in a single laser welding step.

EXAMPLE

In accordance with the above described teaching, a specific example is described in the following. The example is similar to the embodiment shown in FIGS. 3A to 3C. The test membrane was an expanded PTFE membrane (white in color) made according to the teachings of U.S. Pat. No. 3,953,566. The membrane can be also be made according to U.S. Pat. No. 7,306,729 or 5,814,405.

Membrane characteristics for the test membrane:

| Item | Type | Reference WO | Mass [g/m$^2$] | Thickness [µm] | Air flow [Gurley-sec] |
| --- | --- | --- | --- | --- | --- |
| Test membrane | Traditional membrane Non-prism | 5324644 | 3.97 | 9 | 2.2 |

The membrane was rendered oleophobic using methods known in the art, for example as known from U.S. Pat. Nos. 5,116,650, 5,462,586, 5,286,279, and 5,342,434. Carbon black pigment was added to the coating solution and coating was applied to the first side of the membrane followed by conventional drying methods to remove residual solvent. The resulting membrane was black in color in the first side and different than black (gray in color) on the second side. The acoustic vent was then created by laser welding as described above, in particular with reference to FIGS. 3A to 3C. Testing samples were created with membrane slack as explained with reference to FIG. 7 or without membrane slack.

Figure 8:
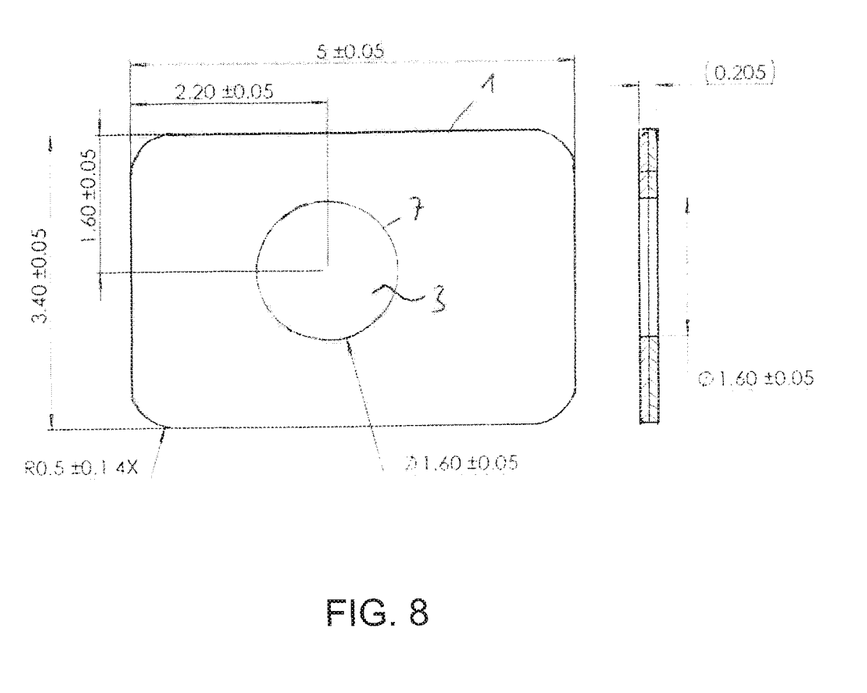
FIG. 8 shows another embodiment of an acoustic vent.

The first polymeric substrate is transparent polypropylene having a thickness of 0.2 mm. The second polymeric substrate is black polypropylene having a thickness of 0.1 mm. Laser welding was performed at 1025 nm with a spot size of 0.6 mm, power of 27 W and speed of 1,000 mm/s. Five loops of laser welding were performed. FIG. 8 shows the geometry design of the acoustic vent. The dimensions indicated in FIG. 8 are given in millimeters (mm).

The acoustic protective cover was tested for acoustic performance. The result was that the acoustic transmission loss was consistently less than 1.5 dB and remained less than 1.5 dB across a wide range of compression forces. The compression force is the force with which the acoustic protection cover is mounted in an enclosure of an electronic device. For testing, the acoustic cover was mounted in a testing apparatus as will be explained in more detail below.

| Sample making technology | Compression force (N) | Acoustic loss at 1,000 Hz (ΔdB) |
|---|---|---|
| Laser welding (with membrane slack) | 0 | 1.29 |
| | 5 | 1.23 |
| | 10 | 1.24 |
| | 20 | 1.31 |
| Laser welding (without membrane slack) | 0 | 1.33 |
| | 5 | 1.27 |
| | 10 | 1.27 |
| | 20 | 1.32 |

Comparative Example

In a comparative example, an acoustic protective cover of similar dimensions as described above was used, but the acoustic protective cover was created by using pressure sensitive adhesives (PSA) instead of laser welding. The membrane with a thickness of 5 μm was held between two PSAs (each 100 μm thick).

As can be seen in the following table, the acoustic loss across a wide range of compression force is very variable and exceeds 1.5 dB.

| Sample making technology | Compression force (N) | Acoustic loss at 1,000 Hz (ΔdB) |
|---|---|---|
| PSA | 0 | 1.88 |
| | 5 | 3.93 |
| | 10 | 5.01 |
| | 20 | 7.16 |

Test Method

The following method was used to test acoustic cover samples. The test was performed in an acoustic response measurement test setup. A sample was placed over a circular aperture of 1 mm diameter on a sample holder plate by means of an adhesive. The sample was placed inside a B&K type 4232 anechoic test box at a distance of 6.5 cm from an internal driver or speaker. The microphone is held stationary with the anechoic test plate by means of a base plate. A compression plate is movably affixed to rails to guide the plate into contact with the vent, placed on the sample holder. Constant compression force is applied to the compression plate by means of a spring and threaded adjuster. Force during the test is measured by a load cell, FC2231-0000-0010-L, available from TE Connectivity Instruments placed between the compression plate and the spring. The speaker was excited to produce an external stimulus at 1 Pa of sound pressure (94 dB SPL) over the frequency range from 100 Hz to 11.8 kHz. The acoustic response was measured with a Knowles SPA2410LR5H MEMS measurement microphone under the following conditions: (a) with the aperture uncovered, (b) with the aperture covered with an acoustic protective cover. The difference in the response was reported in dB (at a specified frequency) as the acoustic loss due to the protective cover (see tables above).

The invention claimed is:

1. An assembly (1) for protecting an acoustic device, comprising:
an expanded polytetrafluorethylene (ePTFE) membrane (3) having a first side (5) and a second side (6) opposite the first side (5), a first polymeric substrate (2) disposed on only a portion of the first side (5) of the ePTFE membrane (3), and a second polymeric substrate (4) disposed on only a portion of the second side (6) of the ePTFE membrane (3) opposite the first polymeric substrate (2), wherein the first polymeric substrate (2) is at least partially transmissive for laser light of a predetermined wavelength,
wherein the ePTFE membrane (3) is joined to the first and second substrates (2, 4) by first and second laser weld joints (9, 10) on the first side (5) of the ePTFE membrane (3) and the second side (6) of the ePTFE membrane (3), respectively, wherein one of the first side (5) of the ePTFE membrane (3) or the second side (6) of the ePTFE membrane (3) is at least partially absorbent for the laser light of the predetermined wavelength; and
wherein a respective other of the first side (5) of the ePTFE membrane (3) or the second side (6) of the ePTFE membrane (3) is at least partially transmissive for the laser light of the predetermined wavelength; and
wherein the membrane (3) further comprises a gradient, wherein the gradient is disposed between the first side (5) of the membrane (3) and the second side (6) of the membrane (3), and wherein the gradient is configured to divide laser energy between the first side (5) of the membrane (3) and the second side (6) of the membrane (3) when the laser energy is absorbed within the membrane (3).

2. The assembly of claim 1, wherein the first and second laser weld joints (9, 10) are congruent to each other.

3. The assembly of claim 1, wherein the first side (5) of the membrane (3) has a first color and the second side (6) of the membrane (3) has a second color that is different from the first color.

4. The assembly of claim 1, wherein the gradient that is disposed between the first side (5) of the ePTFE membrane (3) and the second side (6) of the ePTFE membrane (3) is a color gradient.

5. The assembly of claim 1, wherein the ePTFE membrane (3) has a thickness configured to allow a sufficient amount of heat caused by the laser welding process and necessary for creating the first and second laser weld joints (9,10) to pass through the ePTFE membrane (3) during the laser welding process.

6. The assembly of claim 1, wherein the second polymeric substrate (4) is absorbent for the laser light of the predetermined wavelength.

7. The assembly of claim 1, wherein at least one of the first polymeric substrate (2) or the second polymeric substrate (4) has a thickness of about 100 μm.

8. The assembly of claim 1, wherein the ePTFE membrane (3) is transparent and comprises transparent laser absorbent additives.

9. The assembly of claim 1, wherein the assembly (1) is an acoustic assembly configured to protect an opening for passing sound.

10. A method of manufacturing an assembly (1) for protecting an acoustic device, the method comprising the steps of: providing an expanded polytetrafluoroethylene (ePTFE) membrane (3) having a first side (5) and a second side (6) opposite the first side (5), providing a first polymeric substrate (2) on only a portion of the first side (5) of the ePTFE membrane (3), the first polymeric substrate (2) being at least partially transmissive for laser light of a predetermined wavelength, and providing a second polymeric substrate (4) on only a portion of the second side (6) of the ePTFE membrane (3) opposite the first polymeric substrate (2), joining the ePTFE membrane (3) to the first and second polymeric substrates (2, 4) by laser transmission welding by applying a laser beam of the predetermined wavelength through the first polymeric substrate (2) towards the second polymeric substrate (4), thereby creating first and second laser weld joints (9, 10) on the first side (5) of the ePTFE membrane (3) with the first polymeric substrate (2) and on the second side (6) of the ePTFE membrane (3) with the second polymeric substrate (4), respectively;

wherein one of the first side (5) of the ePTFE membrane (3) or the second side (6) of the ePTFE membrane (3) is at least partially absorbent for the laser light of the predetermined wavelength and wherein a respective other side of the first side (5) of the ePTFE membrane (3) or the second side (6) of the ePTFE membrane (3) is at least partially transmissive for the laser light of the predetermined wavelength; and wherein the membrane (3) further comprises a gradient, wherein the gradient is disposed between the first side (5) of the membrane (3) and the second side (6) of the membrane (3), and wherein the gradient is configured to divide laser energy between the first side (5) of the membrane (3) and the second side (6) of the membrane (3) when the laser energy is absorbed within the membrane (3).

11. The method of claim 10, wherein the gradient that is disposed between the first side (5) of the ePTFE membrane (3) and the second side (6) of the ePTFE membrane (3) is a color gradient.

12. The method of claim 10, wherein the ePTFE membrane (3) comprises a coating (8) applied to at least one of the first side (5) or the second side (6) of the ePTFE membrane (3).

13. The method of claim 10, wherein the ePTFE membrane (3) has a thickness that allows a sufficient amount of heat caused by the laser transmission welding process and necessary for creating the first and second laser weld joints (9, 10) to pass through the ePTFE membrane (3) during the laser transmission welding process.

14. The method of claim 10, wherein the second polymeric substrate (4) absorbs the laser light of the predetermined wavelength.

15. The method of claim 10, further comprising the step of applying a vacuum from the second side (6) of the ePTFE membrane (3) during the joining step.

* * * * *